July 23, 1957     R. M. G. BOUCHER     2,800,100
GENERATOR FOR SONIC AND ULTRASONIC VIBRATIONS
Filed May 5, 1953
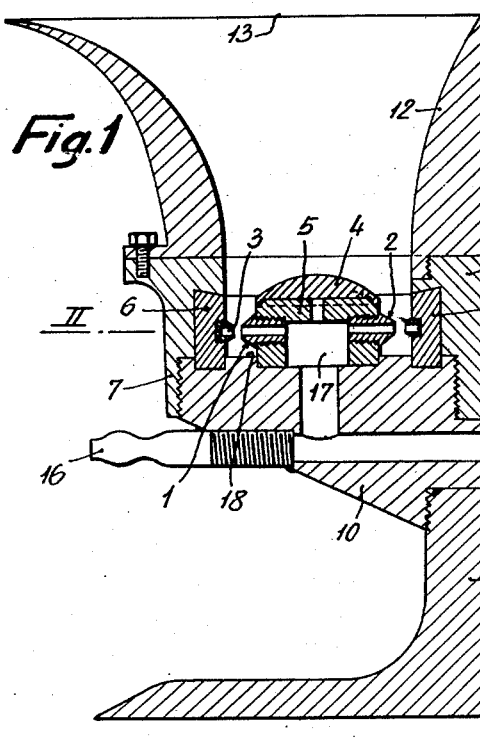
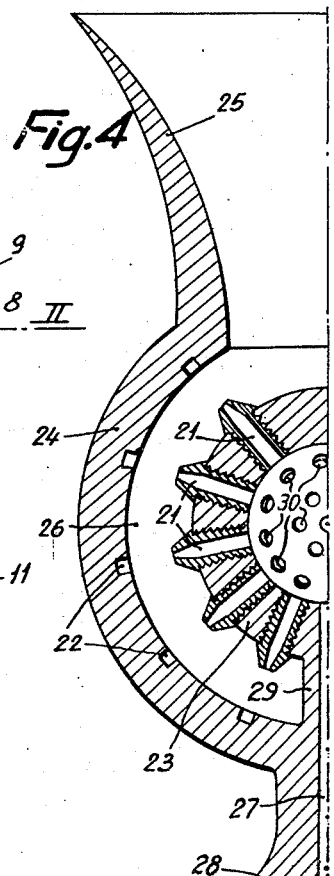
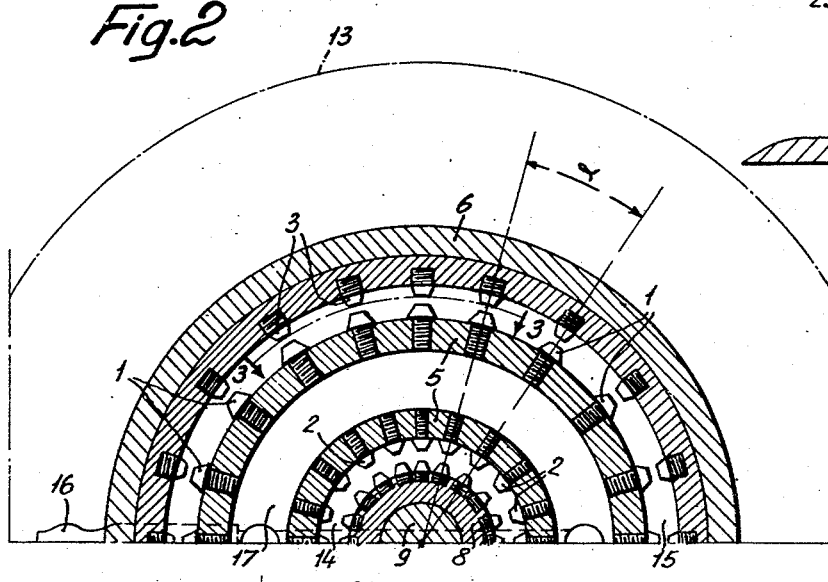
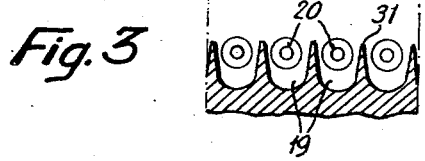
INVENTOR:
RAYMOND MARCEL GUT BOUCHER
BY:

United States Patent Office

2,800,100
Patented July 23, 1957

2,800,100

GENERATOR FOR SONIC AND ULTRASONIC VIBRATIONS

Raymond Marcel Gut Boucher, Neuilly-sur-Seine, France
Application May 5, 1953, Serial No. 353,115

Claims priority, application France May 7, 1952

8 Claims. (Cl. 116—137)

The present invention relates to a generator for sonic and ultrasonic vibrations, using the pipe or whistle technique.

Earlier works, and particularly those of Galtin and Hartmann, have shown that it is possible to obtain vibrations of this type with a high intensity by using a pipe or whistle formed by the combination of a nozzle through which a jet of compressed air is passed and a resonance chamber disposed in front of said nozzle. The apparatus of this type were constituted by a pipe disposed in a current of gas; the output thereof was low owing to the very rapid damping of the vibrations produced by the pipe.

The generator forming the subject of the invention employs pipes or whistles of this type, but arranged under conditions which permit of obtaining great sonic powers with a high output and of emitting varied ranges of vibrations. It is characterised by all or some of the following arrangements, taken seperately or in combination:

(a) The assembly forming a pipe constituted by a compressed air nozzle and a resonance chamber facing it is disposed in a resonance chamber (hereafter referred to as "secondary resonance chamber") open on one side only to the gaseous medium which is to be subjected to the action of sonic or ultrasonic vibrations;

(b) The generator comprises not one, but a plurality of pipes, which may be disposed in one or several rows in a common secondary resonance chamber;

(c) These several pipes may be disposed in one or more annular chambers forming a common secondary resonance chamber, communicating with the outside gaseous medium by a horn of suitable shape, for example, the conventional exponential shape.

In particular, it is thus possible to form an apparatus comprising an annular ring provided with nozzles, some of which face outwards and the others of which face inwards, these nozzles being combined with corresponding primary resonance chambers formed in the two walls, one being inside and the other outside, the ring and the said walls defining two annular secondary resonance chambers concentric to one another.

This plurality of pipes may be arranged in accordance with any other geometrical figure, providing the combination of the pipes with a secondary and preferably common resonance chamber, for example, in accordance with a sphere.

By way of example and for facilitating the understanding of the present invention, there has been shown in the accompanying drawing:

Figure 1, a vertical axial section of half of a generator according to the invention.

Figure 2, a half-section corresponding to the line II—II of Figure 1.

Figure 3, a partial sectional view of a row of pipes in another modification. The line 3—3 and arrows in Fig. 3 indicate the direction in which this section is viewed.

Figure 4, a partial sectional view showing another modification of spherical form.

Referring to Figures 1 and 2, it is seen that in this embodiment, the compressed air is supplied to the "multipipe" by means of a conduit 16 on which may be connected a manometer enabling the supply pressure to be controlled. The air is then distributed inside an annular ring 17 which is obtained by screwing a hollow half-ring 5 on the body of the generator 10. Screwed on to the lateral walls (external and internal) of this ring are threaded pipes or nozzles 2, 1, each formed with a central passage. These pipes terminate in a conical head and they are distributed completely around the circular ring in a number which varies according to the power required of the generator. In the apparatus shown in Figures 1 and 2, there are thus provided two rows of twenty pipes, the axis of each pipe forming an angle of 18° with that of the adjacent pipe. The simple pipes may be distributed on N concentric circles superimposed one above the other and thus forming a generator having N stages. Facing each compressed air aperture is a primary resonance chamber 3 of cylindrical form, the depth of which is equal to the diameter. This primary resonance chamber is formed inside a cylindrical threaded screw, the ends of which form very sharp edges. These threaded screws forming the primary resonance chamber are fixed on the internal face of the metal ring 6 or on the external face of the central ring 8; these two members 6 and 8 are themselves fixed to the body of the generator 10 by the locking action exerted by the central member 9 and the external cylindrical ring 7.

It will be noted that a protection cap 4 is fixed on the upper part of the hollow circular member 5. This latter member may be replaced by a second member similar to 5 and thus renders it possible to obtain a second ring of pipes (second stage). It is obvious that in such a case the members 6 and 8 have the height required for permitting the corresponding series of primary resonance chambers to be secured. The central shell 12 and the exponential horn 13 have for their object to ensure a correct propagation of the sound waves with a minimum of dissipation of acoustic energy. It is thus easily seen that the secondary resonance chambers are formed after general assembly of the member by the annular passages 14 and 15. The metal base 11 ensures the stability of the generator when it is used in the vertical direction with a sonic (or ultrasonic) emission directed in an upward direction.

Interesting outputs have also been obtained with pipes arranged on members of elliptical shape. Without departing from the scope of the present invention, it is therefore possible to manufacture generators of any shape provided that the secondary resonance set up in the chambers of the type 14 and 15 is sufficiently intense.

In this embodiment, the resonance chambers 14 and 15 are each common to a complete row of pipes, their base being flat and simply formed by the upper face of the generator body 10. This common secondary resonance chamber could be replaced by a plurality of separate chambers, each of these chambers 19 partially surrounding one of the pipes 20 of the row, as shown diagrammatically in Figure 3. The structure of the modification partially illustrated in Fig. 3 is substantially identical with the structure of the modification illustrated in Figs. 1 and 2, except that the top surface 18 of base 10 instead of being flat between the annular walls carrying the nozzles and resonance chambers is formed with a plurality of radially extending ribs 31, between which the nozzles are respectively located. The nozzles 20 shown in Fig. 3 and respectively located between the ribs 31 correspond to the nozzles 1 of Fig. 2.

The arrangement shown in Figures 1 and 2 seems to be particularly favourable. However, different shapes may be adopted. Consequently, a modification is shown in Figure 4 in which the nozzles 21 are mounted in a spherical shell 23 which is itself arranged in a second external spherical shell 24 comprising the small primary resonance chambers 22; the secondary resonance chamber 26 is formed by the space between the two shells 23 and 24 and it only opens to atmosphere by way of the horn 25. Compressed air is supplied to the inner spherical shell 23 through the bore 27 (only half of it is shown in Fig. 4). The bore 27 passes in axial direction through the base 28 and wall 29 supporting the shell 23 on the base. Shell 23 is provided with threaded bores 30 into which the pipes 21 are screwed.

The arrangements provided in accordance with the present invention have, among other technical advantages, the following features:

Owing to the presence of the secondary resonance chambers associated with the pipes, the dissipation and the radiation of acoustic energy are reduced as far as possible. The very rapid damping of the sound waves emitted by the pipes is considerably reduced and there is observed a maintenance and a strengthening of the primary resonance waves all along the walls of the channel containing the various pipes.

The power of such a generator may be made as high as desired by increasing at will the number of simple pipes fixed on the walls of the secondary resonance chamber. As the frequency of the generator is moreover a function of the height of the primary resonance cavities, this factor may therefore be considered as completely independent of the total power of emission. There is here a fundamental difference with the simple height, the frequency of which is inversely proportional to the power (example: acoustic emission of 6 watts at below 50 kilocycles and 160 watts at 10 kilocycles/sec.).

Although in the case of a "simple pipe," the acoustic output (rate of conversion of the supply energy into sound energy) is only in the region of 4%, that obtained with the apparatus according to the present invention may reach and exceed the figure of 20% owing to the double resonance arrangement.

It is possible to obtain very high average acoustic intensities of the order of 140 to 160 decibels: the energy density exceeds 100 ergs/cm.$^3$ and may reach and exceed 1,000 ergs/cm.$^3$. If the radiation pressure is expressed by the formula:

$$p_r = \frac{1+\gamma}{2} \cdot E$$

wherein $\gamma$ is the ratio of the latent heats of the gaseous medium, it is easily possible to verify that a generator with 80 pipes and emitting below 20 kilocycles/sec., is capable of supporting in the air a circular metal plate of a weight equal to 50 grammes.

As the pipes and the primary resonance chambers are on the one hand multiple and on the other hand easily removable, it is possible to obtain with a single apparatus different frequencies either simultaneously or successively, by changing the pipes of a certain tone for others of a different tone. It is also possible to select the pipes in such manner as to achieve the effects of pulsation.

It is obvious that the apparatus constructed in this manner are capable of solving a large number of technical problems. In order to give an idea of the results which it is possible to obtain the following numerical data are given, simply by way of example:

By decreasing the dimensions of the primary resonance chambers, the multi-pipe generators may emit ultra-short sound waves. Experimentally, an emitter established in accordance with Figures 1 and 2 has been able to supply sounds of 170 kilocycles. The most economical range is between 10 and 20 kilocycles. The use of water vapour renders it possible to obtain waves of 20 kilocycles/sec. under very interesting conditions.

The supply pressure which is most favourable for satisfactory operation of the generators of 10 and 20 kilocycles/sec. is between 2 and 3.5 kg./cm.$^2$. If a stage apparatus of the type shown in Figures 1 and 2 and comprising 40 simple pipes (diameter of aperture 2 mm.) is employed, the maximum air consumption is in the region of 300 or 400 cu. m. per hour. This represents a consumption of electrical energy at the compressor in the region of 20 kwh. On average, it is possible to reckon on a sound emission power of 100 watts for each pipe emitting at 20 kilocycles/sec. A generator of this type formed of 40 simple pipes (20 on each circumference) may reach a total emission power of 4 to 5 kw. A generator formed of 80 simple pipes (20 pipes distributed on 4 circumferences) permits 8 to 10 kw. to be obtained, which under certain other conditions (concentration of particles, exposure time) permits of treating between 5 and 10,000 cu. m. of gas per hour.

The aperture of the primary resonance chambers is in general between 2 and 6 mm. The diameter of the compressed air supply conduit is equal to the diameter of the primary resonance chamber (which is itself equal to its depth) when establishing the best conditions for working by resonance. As is known, the velocity of the flow of air on leaving the ejection nozzle must always be supersonic.

This apparatus may be used in all the sonic processes, whether industrial or otherwise, which have for their object the treatment of inert bodies (solids, liquids or gases) or living organisms (insects, mammals, etc.).

I claim:

1. A compressed air generator for sonic or ultrasonic vibrations comprising a plurality of compressed air nozzles, a compressed air conduit through which compressed air is supplied to all said nozzles, a plurality of first resonance chambers respectively facing said nozzles, and a common secondary resonance chamber having an annular wall portion facing said nozzles and carrying said first resonance chambers, said common resonance chamber being open on one side only to the gaseous medium which is to be subjected to the sonic or ultrasonic vibrations.

2. A generator for sonic and ultrasonic vibrations comprising a plurality of compressed air nozzles, at least one compressed air conduit through which compressed air is supplied to all said nozzles, a plurality of first resonance chambers respectively facing said nozzles, and a common annular secondary resonance chamber having an annular wall portion facing said nozzles and carrying said first resonance chambers, said common resonance chamber having an open end, and a horn shaped extension projecting from said open end.

3. A generator for sonic and ultrasonic vibrations comprising a plurality of compressed air nozzles arranged in a number of annular rows, at least one compressed air conduit through which compressed air is supplied to all said nozzles, a plurality of first resonance chambers respectively facing said nozzles, and a common annular secondary resonance chamber having an annular wall portion facing said nozzles and carrying said first resonance chambers, said common resonance chamber having an open end, and a horn shaped extension projecting from said open end.

4. A generator for sonic and ultrasonic vibrations comprising an annular nozzle ring, a number of nozzles on said ring some facing outwards and some facing inwards of said ring, at least one compressed air conduit through which compressed air is supplied to all said nozzles, two annular walls one outside and one inside said ring and having resonance chambers arranged therein so that a resonance chamber faces inwards towards each outwardly facing nozzle and a resonance chamber faces outwards towards each inwardly facing nozzle, said walls defining two annular concentric secondary resonance chambers in which the first named resonance chambers are disposed and which are open on one side only to the outside gaseous medium.

5. A generator for sonic and ultrasonic vibrations comprising a support of geometrical shape, a plurality of nozzles arranged in spaced relation in the support, at least one conduit in said support through which compressed air is led to each of said nozzles, at least one wall of similar geometrical shape as the support surrounding the latter and carrying a plurality of resonance chambers respectively facing said nozzles, said support and said wall defining a secondary resonance chamber in which all the first named resonance chambers are disposed and which is open on one side only to the outside gaseous medium.

6. A generator for sonic and ultrasonic vibrations according to claim 5 in which the support, one wall and one secondary resonance chamber are of generally spherical shape.

7. A generator for sonic and ultrasonic vibrations, comprising, in combination, an enclosure having a pair of spaced annular wall portions located about a common axis, directed toward each other, and defining at one end an opening of the enclosure, the latter having a third wall portion extending across an opposite end of said pair of annular wall portions, closing the space therebetween, and directed toward said opening; a plurality of nozzles distributed about one of said annular wall portions and having outlet ends directed toward the other of said annular wall portions; a plurality of resonance chambers respectively located opposite said nozzles on said other annular wall portion, and said wall portions of said enclosure forming a common secondary resonance chamber; and fluid conveying means communicating with said nozzles for supplying compressed air thereto.

8. A generator for sonic and ultrasonic vibrations, comprising, in combination, an enclosure having a pair of spaced annular wall portions located about a common axis, directed toward each other, and defining at one end an opening of the enclosure, each of said walls forming part of a sphere whose center is located in said axis, said enclosure having a third wall portion extending across an opposite end of said pair of annular wall portions, closing the space therebetween, and directed toward said opening; a plurality of nozzles distributed about one of said annular wall portions and having outlet ends directed toward the other of said annular wall portions; a plurality of resonance chambers respectively located opposite said nozzles on said other annular wall portion; and fluid conveying means communicating with said nozzles for supplying compressed air thereto.

References Cited in the file of this patent

UNITED STATES PATENTS

| 1,980,171 | Amy | Nov. 13, 1931 |
| 2,532,554 | Joeck | Dec. 5, 1950 |

OTHER REFERENCES

Scientific American, vol. 162, No. 3, March 1948, pages 148–149, "Soundless Sound Waves."